(12) United States Patent
Tajima

(10) Patent No.: US 7,357,502 B2
(45) Date of Patent: Apr. 15, 2008

(54) REVOLVING STRUCTURE FOR GLASSES PART

(75) Inventor: Yasuhiro Tajima, Sabae (JP)

(73) Assignee: Charmant Co., Ltd., Sabae-shi, Fukui (JP)

( * ) Notice: Subject to any disclaimer, the term of this patent is extended or adjusted under 35 U.S.C. 154(b) by 76 days.

(21) Appl. No.: 11/352,032

(22) Filed: Feb. 10, 2006

(65) Prior Publication Data

US 2006/0181675 A1    Aug. 17, 2006

(30) Foreign Application Priority Data

Feb. 15, 2005    (JP) .............................. 2005-038387

(51) Int. Cl.
*G02C 5/22* (2006.01)
(52) U.S. Cl. .................. 351/153; 351/121; 16/228
(58) Field of Classification Search ................ 351/111, 351/119, 121, 153; 16/228
See application file for complete search history.

(56) References Cited

U.S. PATENT DOCUMENTS

| 2,260,403 | A | 10/1941 | Preston |
| 4,018,516 | A | 4/1977 | Hideaki et al. |
| 4,672,714 | A | 6/1987 | Bos |
| 6,085,388 | A | 7/2000 | Kaneko |
| 6,247,810 | B1 * | 6/2001 | Hirano ........................ 351/153 |
| 2003/0147045 | A1 * | 8/2003 | Fukuoka ..................... 351/153 |

FOREIGN PATENT DOCUMENTS

| EP | 1 008 889 A1 | 6/2000 |
| JP | 2003-121803 | 4/2003 |

* cited by examiner

*Primary Examiner*—Huy K Mai
(74) *Attorney, Agent, or Firm*—Flynn, Thiel, Boutell & Tanis, P.C.

(57) ABSTRACT

A revolving structure for a glasses part for revolving a second member relative to a first member is provided with a rotational shaft provided on the first member and a cylindrical member with elasticity which is fitted on the rotational shaft externally, where the cylindrical member is fitted on the second member in a state that the cylindrical member is pressed by a pressing member and is not rotated, even if the rotational shaft of the first member is rotated. The second member has a groove portion a in which the cylindrical member is fitted and an arc face for contact with a circumferential face of the cylindrical member is formed on the groove portion. Accordingly, a revolving structure for a glasses part where when a rotational shaft is rotated, sufficient frictional resistant force is provided and entrance of dust or the like is prevented.

10 Claims, 9 Drawing Sheets

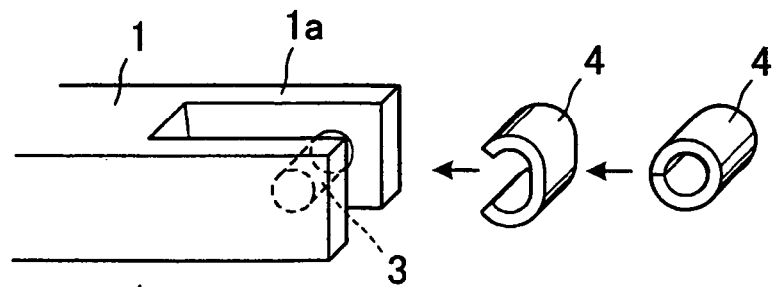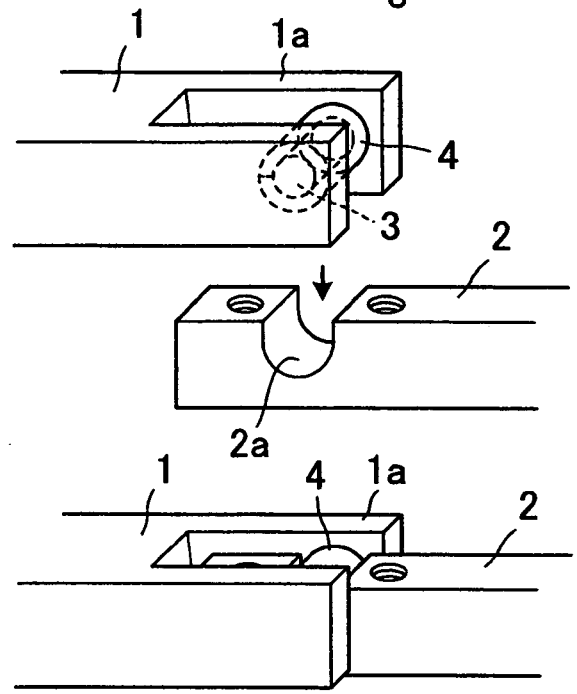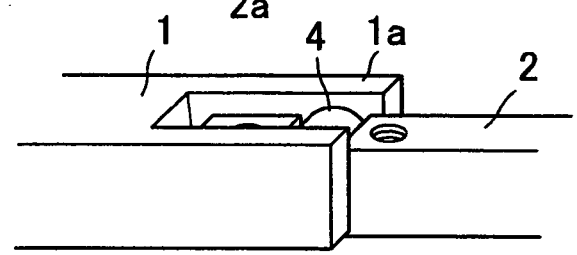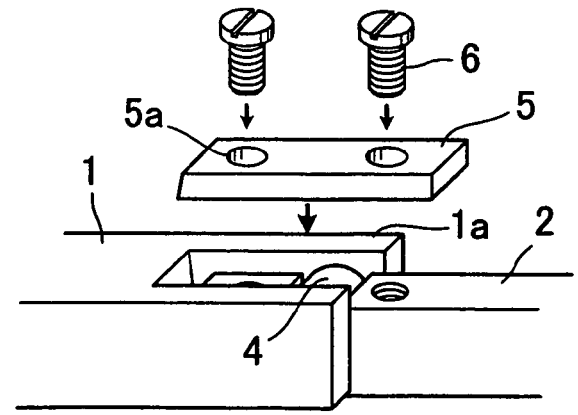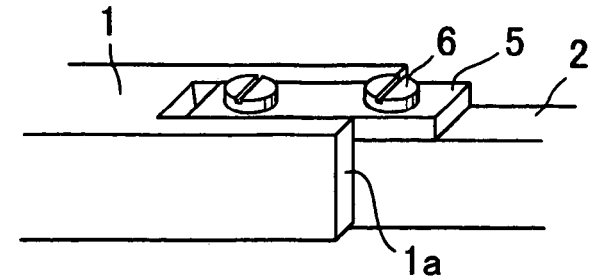

Priority Art

Priority Art

Priority Art

REVOLVING STRUCTURE FOR GLASSES PART

BACKGROUND OF THE INVENTION

1. Field of the Invention

The present invention relates to a revolving structure in glasses where, relative to a first member, for example, a bracket, a second member, for example, a temple, is revolved with resistance.

More specifically, the present invention relates to a revolving structure for a glasses part where, when a glasses part is revolved, a proper resistance force (a grip feeling) is generated, and movement of the glasses part is restricted after the revolution, so that positional deviation of the glasses part is not caused.

2. Description of the Related Art

Conventionally, as a revolving structure for a glasses part, a structure such as shown in FIGS. 9(a-b) and 10 has been known (for example, see Patent Literature 1).

In FIGS. 9(a-b) and 10, for attaching a main front frame 100 to a sub-front frame 101 in a revolvable manner thereto, a revolving structure for the glasses part is applied to a bridge portion 102.

FIG. 9(a) shows a state that the main front frame 100 is suspended from the sub-front frame 101.

FIG. 9(b) shows a state that the main front frame 100 has been revolved relative to the sub-front frame 101.

FIG. 10 shows a revolving structure for the main front frame 100.

A rotational shaft 103 with a round-bar shape is used for a coupling structure of the main front frame 100 and the sub-front frame 101.

The rotational shaft 103 and a resin-made pipe 105 shown in FIG. 10 are revolved according to the revolution of the rims 104 of the main front frame 100.

At that time, the rotational shaft 103 and the resin-made pipe 105 are revolved integrally against a frictional resistance with a bridge casing 106 and a resilient force of a leaf spring 106a.

That is, the resin-made pipe 105 contacts with the wire-like leaf spring 106a and the bridge casing 106, while the rotational shaft 103 and the resin-made pipe 105 contact with each other via a whole circumferential face of the rotational shaft 103, so that the rotational shaft 103 and the resin-made pipe 105 are rotated integrally with each other.

When a user stops the revolution of the main front frame 100 at his/her desired angle, the resin-made pipe 105 and the rotational shaft 103 are held at the stopped position owing to the frictional resistance between the resin-made pipe 105 and the bridge casing 106 and the biasing force due to the resilient deformation from the leaf spring 106a.

Detent feeling occurs according to the revolution of the main front frame 100 to the sub-front frame 101.

Patent Literature 1: JP-A-2003-121803

In the revolving structure for a glasses part described above, however, since a contacting area between the resin-made pipe 105 and the bridge casing 106 is small, even if the leaf spring 106a is pressed by a screw 107, a sufficient frictional resistance cannot be obtained.

That is, since the resin-made pipe 105 only contacts with a recessed face of the bridge casing 106 at three portions thereof and with the leaf spring 106a at one portion thereof in a linear manner, frictional force cannot be developed sufficiently.

On the other hand, in such a revolving structure, a space occurs necessarily between the recessed portion of the bridge casing 106 and the resin-made pipe 105 and dust or the like easily enters in the space, so that frictional damage may be caused due to the dust biting in the resin-made pipe 105.

SUMMARY OF THE INVENTION

In view of these circumstances, the present invention has been made for overcoming the problem in the conventional art.

That is, an object of the present invention is to provide a revolving structure for a glasses part which provides a sufficient frictional force when a rotational shaft is rotated and which does not allow the entrance of dust or the like.

As the result of keen research and development to these circumstances, the present inventor has found such a fact that the above problem can be solved by imparting a large frictional force to a cylindrical member to prevent the revolution of the cylindrical member and developing a frictional resistant force between the rotational shaft and the resin-made pipe sufficiently, and the inventor has completed the present invention based upon this finding.

That is, a feature (1) of the present invention lies in a revolving structure for a glasses part for revolving a second member relative to a first member, comprising a rotational shaft provided on the first member, and a cylindrical member with elasticity which is press-fitted on the rotational shaft externally, wherein the cylindrical member is fitted to the second member in a state such that the cylindrical member has been pressed by a pressing member, and the cylindrical member is prevented from being rotated, even if the rotational shaft of the first member is rotated.

A feature (2) of the present invention lies in the revolving structure for a glasses part described in the above item (1), wherein the second member has a groove portion in which the cylindrical member is fitted and the groove portion is formed with an arc face for contacting with a circumferential face of the cylindrical member.

A feature (3) of the present invention lies in the revolving structure for a glasses part described in the above item (2), wherein the arc face is a half circumferential face.

A feature (4) of the present invention lies in the revolving structure for a glasses part described in the above item (2), wherein the cylindrical member is set to protrude from the groove portion by a constant thickness and a protruding portion of the cylindrical member is pressed by the pressing member.

A feature (5) of the present invention lies in the revolving structure for a glasses part described in the above item (2), wherein a groove portion is formed in the pressing member and the cylindrical member is inserted in the groove portion to come in contact with the pressing member.

A feature (6) of the present invention lies in the revolving structure for a glasses part described in the above item (2), wherein one end of the pressing member is fitted into the second member, the other end thereof is fixed to the second member by a screw member, and the cylindrical member is pressed by a central portion of the pressing member.

A feature (7) of the present invention lies in the revolving structure for a glasses part described in the above item (2), wherein one end and the other end of the pressing member are fixed to the second member by screw members, and the cylindrical member is pressed by a central portion of the pressing member.

A feature (8) of the present invention lies in the revolving structure for a glasses part described in the above item (5), wherein the second member, the first member, and the pressing member are fixed to one another by screwing a screw member in a screw hole with a bottom formed in the pressing member via a through-hole formed in the second member.

A feature (9) of the present invention lies in the revolving structure for a glasses part described in the above item (5), wherein the pressing member, the first member, the second member, and a receiving member are fixed mutually by screwing a screw member in a screw hole with a bottom formed in the receiving member via a through-hole formed in the pressing member and a through-hole formed in the second member.

A feature (10) of the present invention lies in the revolving structure for a glasses part described in one of the above items (1) to (7), wherein the first member and the second member are a bracket and a temple, respectively.

A feature (11) of the present invention lies in the revolving structure for a glasses part described in the above item (8) or (9), wherein the first member and the second member are a temple and a bracket, respectively.

Any constitution obtained by combining the items (1) to (11) properly can be adopted if the constitution achieves the object of the present invention.

According to the present invention, since a revolving structure for a glasses part for revolving a second member relative to a first member, comprises a rotational shaft provided on the first member and a cylindrical member with elasticity which is press-fitted on the rotational shaft externally, wherein the cylindrical member is fitted to the second member in a state that the cylindrical member is pressed by a pressing member, and the cylindrical member is prevented from being rotated even if the rotational shaft of the first member is rotated, frictional resistance is developed sufficiently between the cylindrical member and the rotational shaft.

Since the second member has the groove portion in which the cylindrical member is fitted and the groove portion is formed with the arc face for contacting with the circumferential face of the cylindrical member, dust or the like is prevented from entering in the groove portion as much as possible.

Since the cylindrical member is set to protrude from the groove portion by a constant thickness and the protruding portion of the cylindrical member is pressed by the pressing member, the cylindrical member with elasticity deforms so that an area thereof contacting with an inner wall of the groove portion and frictional force increases, and a gap in the groove portion is made small as much as possible.

Further, the cylindrical member generates a force clamping the rotational shaft so that the frictional resistance between the cylindrical member and the rotational shaft is increased.

BRIEF DESCRIPTION OF THE DRAWINGS

FIGS. 2(a-e) are explanatory views showing parts constituting a revolving structure for a glasses part and a procedure for assembling the parts, FIG. 2(a) showing a distal end side of a bracket, FIG. 2(b) showing a state before a cylindrical member is fitted in a groove formed in the bracket, FIG. 2(c) showing a state that the cylindrical member has been fitted in the groove formed in the bracket, FIG. 2(d) showing a state before a pressing member is attached to the bracket, and FIG. 2(e) showing a state after the bracket has been coupled to the bracket;

BEST MODE FOR CARRYING OUT THE INVENTION

The best mode for carrying out the invention will be explained below with reference to the drawings.

Figure 1:
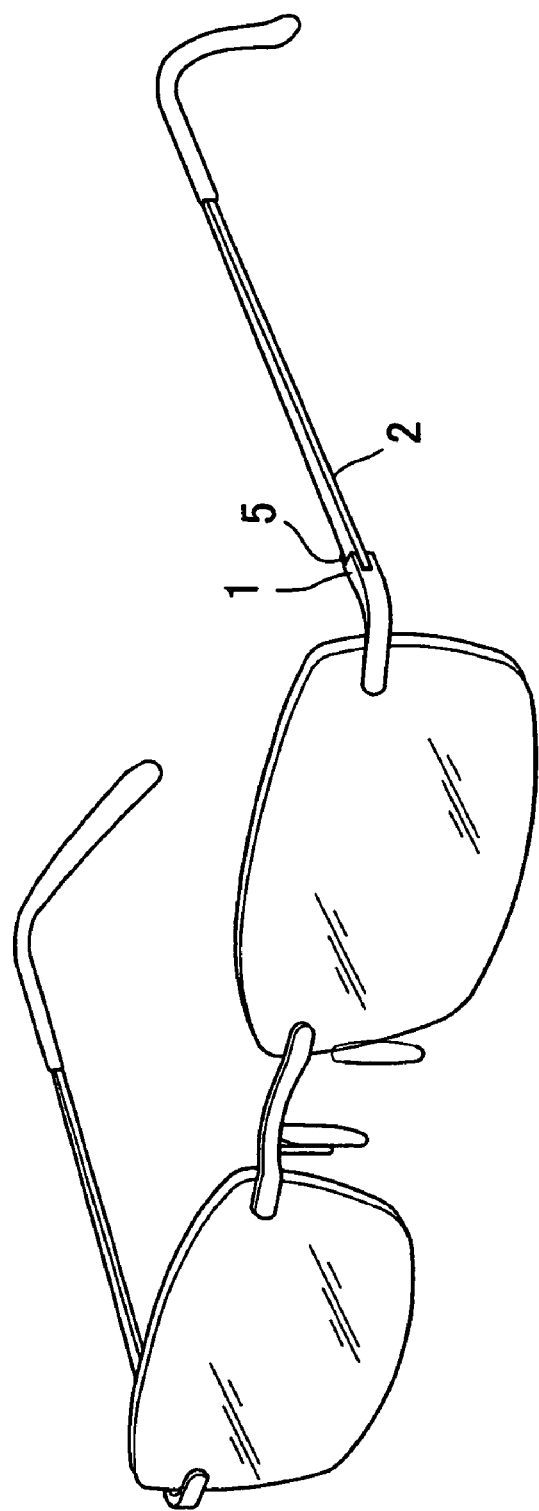
FIG. 1 is an explanatory view showing glasses having a first embodiment of a revolving structure for a glasses part of the present invention.

FIG. 1 shows glasses having one embodiment of a revolving structure for a glasses part of the present invention.

As shown in FIG. 1, the revolving structure for a glasses part of the present embodiment is applied for coupling a temple 2 and a bracket 1.

Of course, the revolving structure can be applied to any portion to which the revolving structure can be applied, and it can be applied to a double frame glasses where assistant glasses such as sunglasses is revolved to main unit glasses.

FIGS. 2(a-e) show parts constituting a revolving structure for a glasses part and a procedure for assembling the parts.

A distal end side of the bracket 1, which is the first member, is shown in FIG. 2(a).

More specifically, a cylindrical rotational shaft 3 is provided between a pair of plate portions 1a (may be called "coma") of the bracket 1.

In order to attach the rotational shaft 3 between the plate portions 1a, the rotational shaft 3 may be simultaneously formed between the plate portions integrally with the bracket 1 when the bracket 1 is formed.

Of course, it is possible to attach the rotational shaft 3 which is a separate member between the plate portions which are not formed integrally by adhesion.

A cylindrical member 4 made from a resin material which is a separate member is press-fitted on the rotational shaft 3.

In this case, the cylindrical member 4 is press-fitted on the rotational shaft 3 while a slotted portion formed in the cylindrical member 4 is being opened.

Incidentally, the material for the cylindrical member 4 may be a polyacetal resin, polyamide resin, PEEK resin, or the like in view of, for example, wear resistance.

Next, as shown in FIG. 2(b), the cylindrical member 4 is fitted in a groove portion 2a formed in a temple 2 which is a second member.

Since an arc face (in this case, the arc face is a half circumferential face) for contact with a circumferential face of the cylindrical member 4 is formed in a U shape on this groove portion 2a, the arc face and the circumferential face can be simply caused to abut each other by fitting the cylindrical member 4 of the bracket toward the groove portion 2a of the temple.

FIG. 2(c) shows a state that the bracket 1 has been fitted in the temple 2.

As shown in FIG. 2(c), the setting has been made such that, when the rotational shaft 3 of the bracket 1 is fitted in the groove portion 2a of the temple 2, the cylindrical member 4 is made to protrude from the groove portion 2a by a predetermined thickness.

Next, as shown in FIG. 2(d), the protruding portion is pressed by a plate-like pressing member 5 with rigidity from this state.

The material for this pressing member 5 may be a material with rigidity which is not bent, even if it presses the cylindrical member, for example, metal (for example, titanium alloy) or hard plastic.

In detail, the pressing member 5 is formed at two portions of one end and the other end thereof with through-holes 5a, while the temple 2 is formed at two portions thereof corresponding to the respective through-holes 5a with screw holes 2b.

The cylindrical member 4 is pressed by a central portion of the pressing member 5 by screwing screws 6 in the screw holes 2b via the respective through-holes 5a.

FIG. 2(e) shows a state that the pressing member 5 has been attached and the cylindrical member 4 has been pressed by the pressing member 5.

FIGS. 3(a-b) show a section of a coupling structure of the bracket 1 and the temple 2.

Figure 3A:
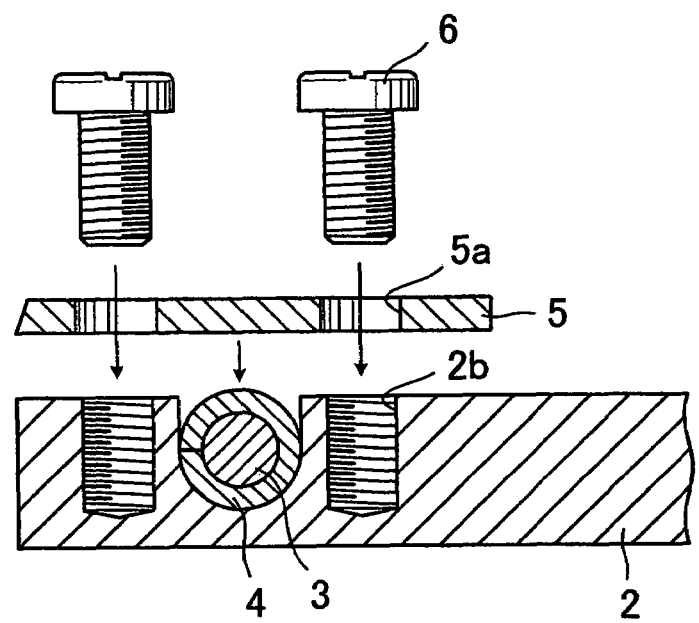
FIGS. 3(a-b) are explanatory views showing a sectional view of a coupling structure of the bracket and the bracket, FIG. 3(a) showing a state before the pressing member is attached to the bracket, and FIG. 3(b) showing a state after the pressing member has been attached to the bracket.
Figure 3B:
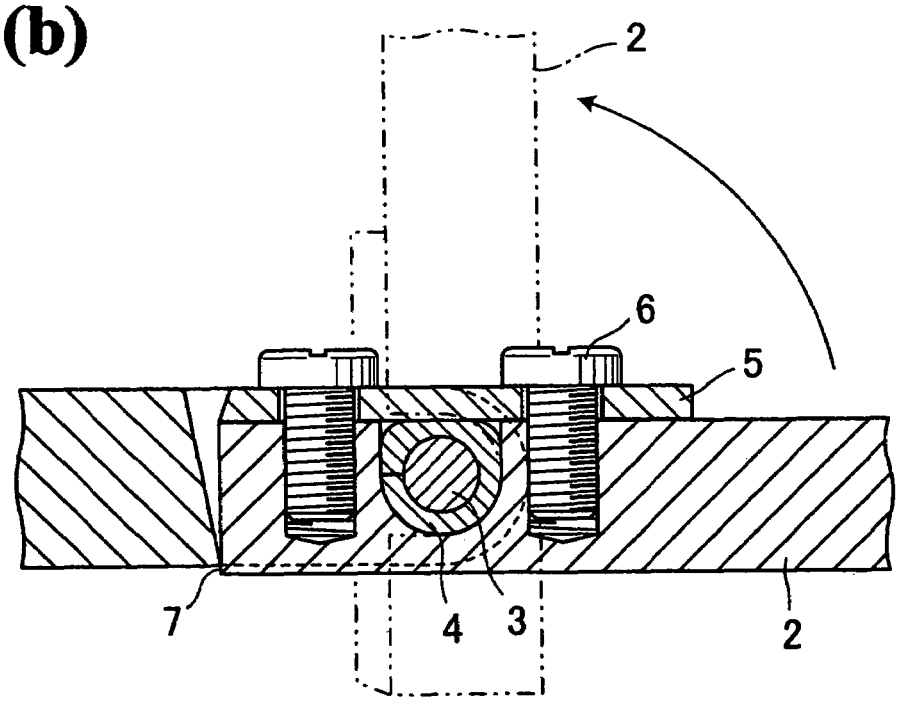

FIG. 3(a) shows a state of the bracket 1 and the temple 2 before the pressing member 5 is attached, while FIG. 3(b) shows a state of the bracket 1 and the temple 2 after the pressing member 5 has been attached to perform pressing.

As shown in FIG. 3(a), in the state that, before the pressing member 5 is attached, a half of an outer circumferential face of the cylindrical member 4 contacts with the groove portion 2a, where a portion of an upper end side of the cylindrical member 4 protrudes from an upper face 2c of the temple 2 by a predetermined thickness.

As described above, when the pressing member 5 is caused to abut the temple 2 to be fastened thereto using two screws 6 from this state, as shown in FIG. 3(b), the cylindrical member 4 with an elasticity, made from a resin material, receives a pressure to deform, so that a contacting area with the groove portion 2a is further expanded and the cylindrical member 4 is fitted on the temple 2.

The elastic force of the cylindrical member 4 increases and the frictional resistant force between the cylindrical member 4 and an inner wall of the groove portion increases, so that the cylindrical member 4 is gripped in the groove portion securely.

A gap in the groove portion further decreases so that dust or the like is prevented from entering in the groove portion as much as possible.

On the other hand, the cylindrical member 4 generates a force for fastening the rotational shaft 3 and a frictional resistance between the cylindrical member 4 and the rotational shaft is increased so that, even if the rotational shaft 3 is rotated, the cylindrical member 4 is prevented from rotating together with the rotational shaft 3.

As a result, the resistant force (namely, gripping force) generated when the temple 2 is revolved increases so that the holding force at a predetermined angular position is increased.

Though the present invention has been explained above, the present invention is not limited to the embodiment described above. Of course, the present invention can be variously modified or changed within the scope and spirit of the present invention.

For example, in the embodiment described above, the case of the pressing member 5 being attached to the temple 2 using two screws 6 has been explained, but such a structure can be adopted that the pressing member 5 is attached to the temple 2 in a cantilever manner.

Figure 4A:
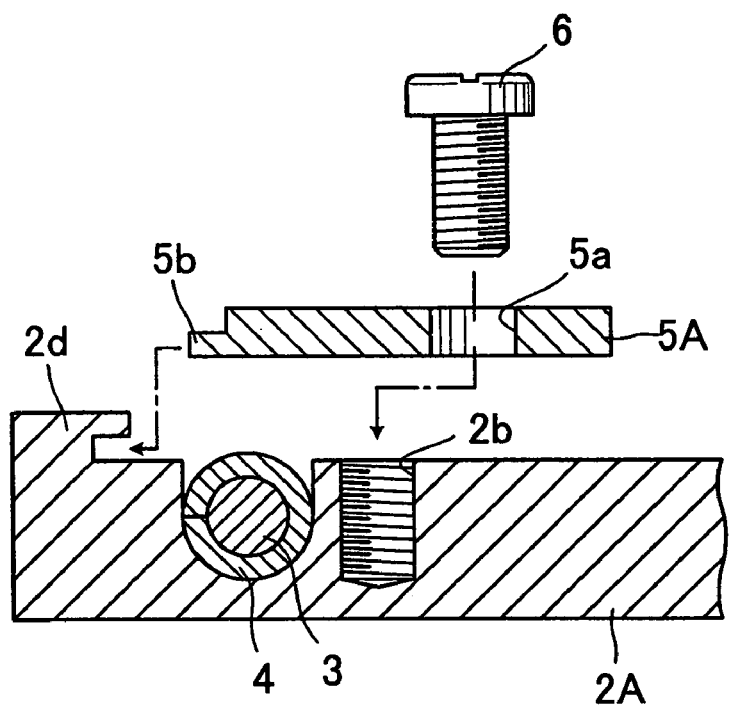
FIGS. 4(a-b) are explanatory views showing a modification of a revolving structure for a glasses part of the present invention, FIG. 4(a) showing a state before a pressing member is attached to the bracket, and FIG. 4(b) showing a state after the pressing member has been attached to a bracket.
Figure 4B:
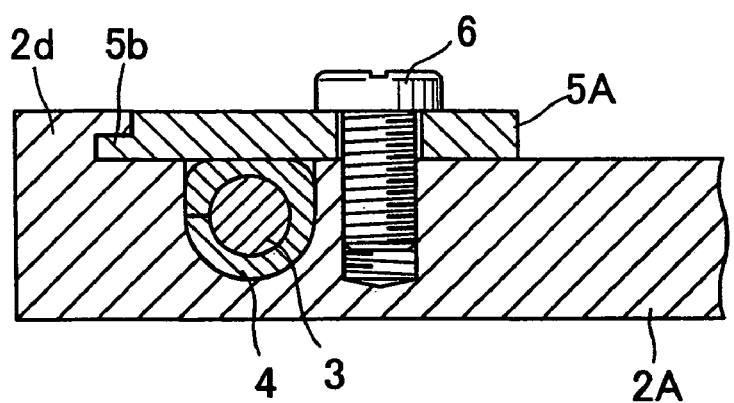

As shown in FIGS. 4(a) and 4(b), such a constitution may be adopted that a step portion 5b is formed at one end of a pressing member 5A and the step portion 5b is inserted inside a projection portion 2d with an inverted L shape of a temple 2.

In an attaching structure in this case, when the step portion 5b which is positioned at the one end of the pressing member 5A is inserted inside the projection portion 2d and a screw 6 is screwed to a screw hole 2b of the temple 2A via a through-hole 5a at the other end side of the pressing member 5A, a lever force serves, due to fastening of the screw 6, so that the cylindrical member 4 is pressed strongly by the pressing member 5A (see FIG. 4(a)→4(b)).

Thereby, one end of the pressing member is fitted in the temple 2A, while the other end thereof is screwed to the temple 2A, so that the cylindrical member 4 is pressed by a central portion of the pressing member.

A gap in the groove portion is reduced by the pressing work, so that the cylindrical member is prevented from rotating together with the rotational shaft.

Figure 5A:
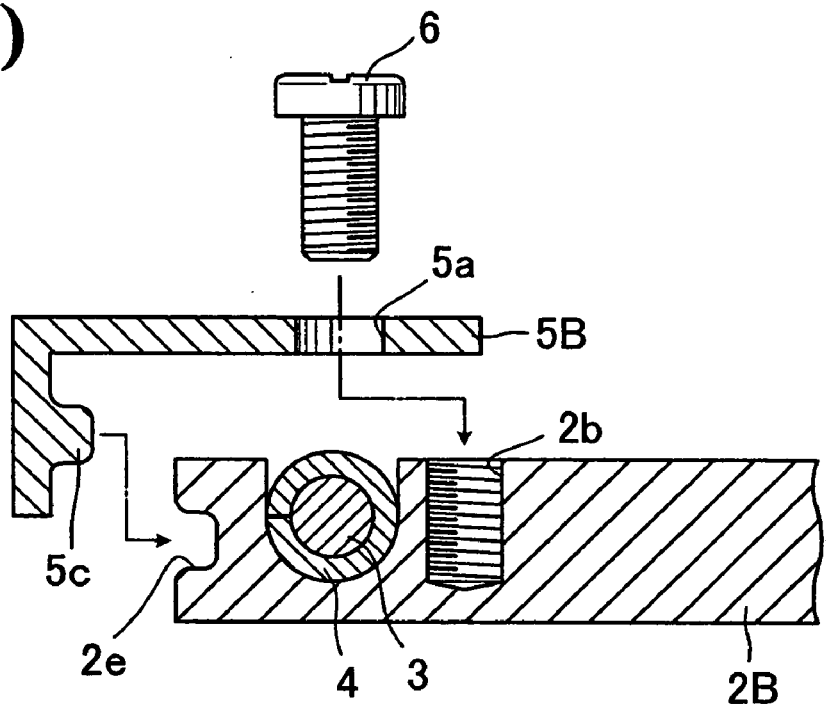
FIGS. 5(a-b) are explanatory views showing another modification of a revolving structure for a glasses part of the present invention, FIG. 5(a) showing a state before a pressing member is attached to the bracket, and FIG. 5(b) showing a state after the pressing member has been attached to a bracket.
Figure 5B:
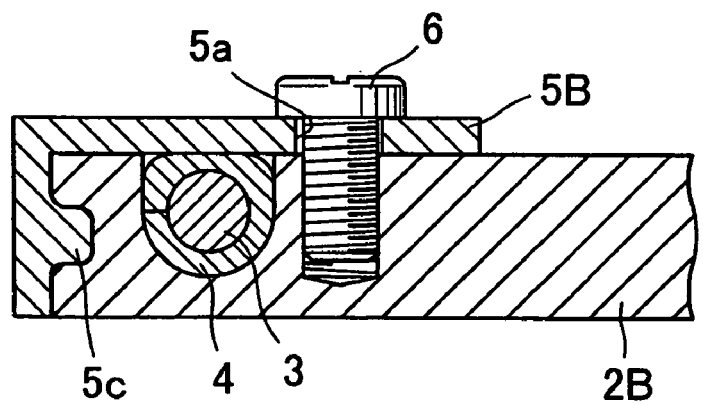

As shown in FIGS. 5(a) and 5(b), such a constitution can be adopted that a pressing member 5B with an L shape is used, and a projection 5c formed at a short leg portion of the pressing member 5B with an L shape is caused to engage a groove 2e formed at an end portion of a temple 2B (see FIG. 5(a)).

In this case, one end of the pressing member is fitted in the temple 2B, while the other end thereof is screwed to the temple 2B, so that the cylindrical member is pressed by a central portion of the pressing member, so that an effect substantially similar to that in the structure shown in FIGS. 4(a) and 4(b) can be obtained.

Figure 6:
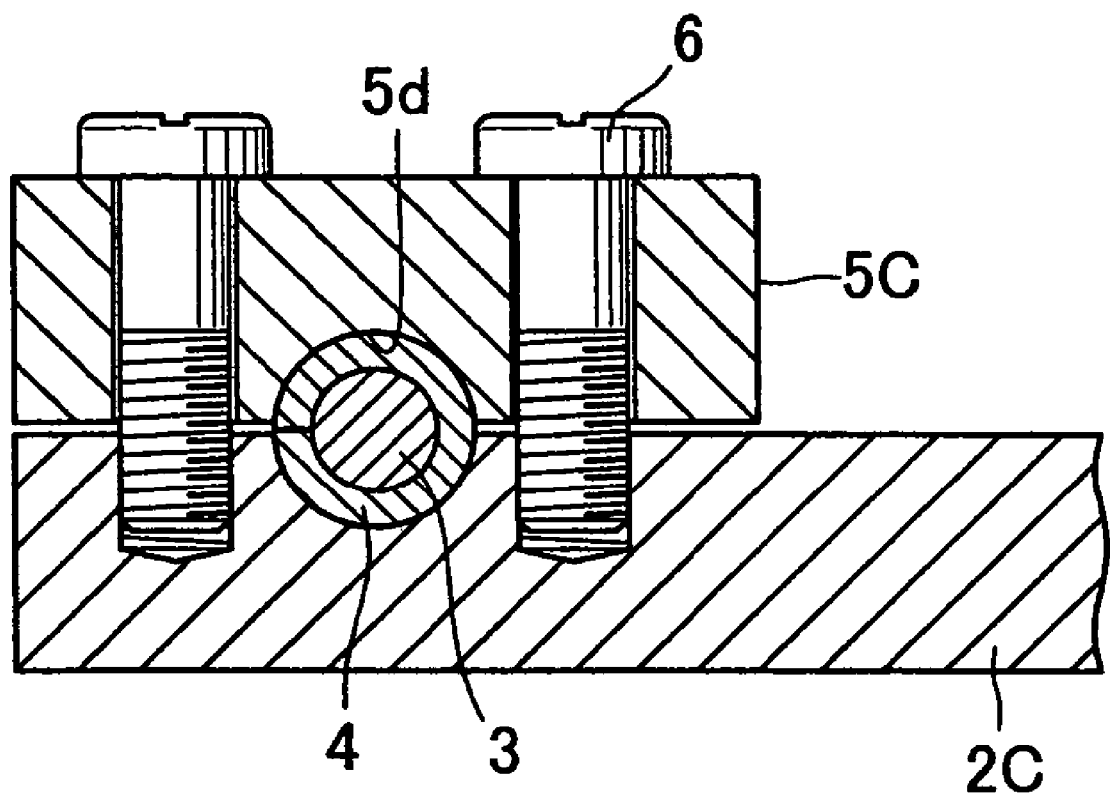
FIG. 6 is an explanatory view showing still another modification of a revolving structure for a glasses part of the present invention, showing a state that a pressing member has been attached to a bracket.

In the above embodiments, though the case where the plate-like pressing member 5 has been used has been explained as shown FIG. 6, such a constitution may be adopted that an arc-shaped groove 5d is formed on a pressing member 5C in addition to a temple 2C and the cylindrical member 4 is fastened between an inner peripheral face of the arc groove of the pressing-member 5C and the groove portion of the temple 2C so that frictional resistance is obtained.

Figure 7A:
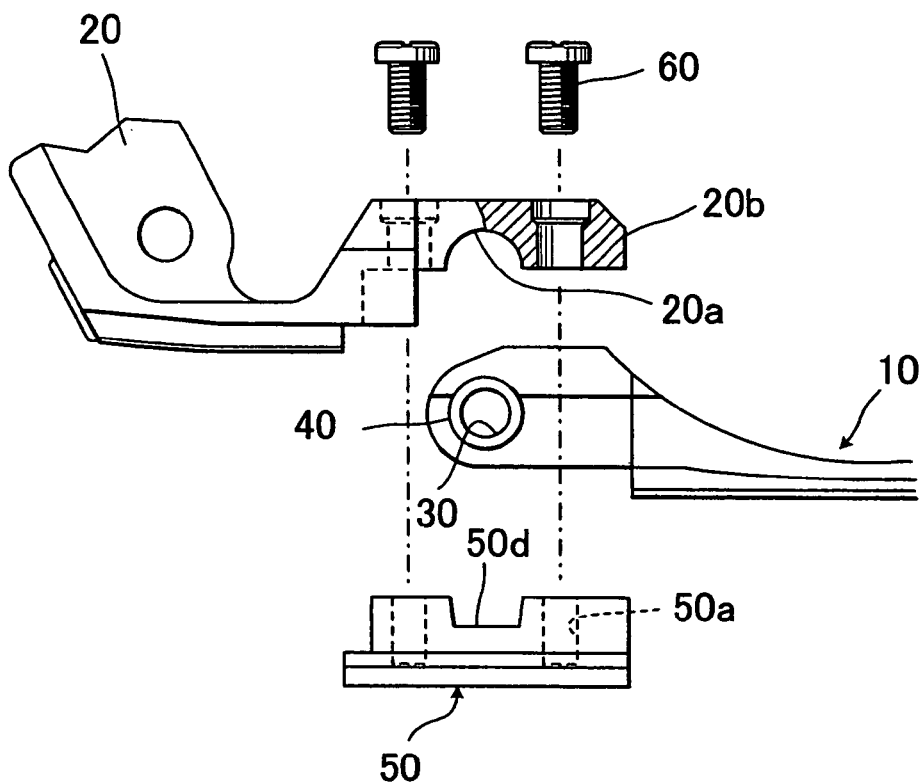
FIGS. 7(a-b) are explanatory views showing another modification of a revolving structure for a glasses part of the present invention, FIG. 7(a) showing a state before a pressing member is attached to the bracket, and FIG. 7(b) showing a state after the pressing member has been attached to a bracket.
Figure 7B:
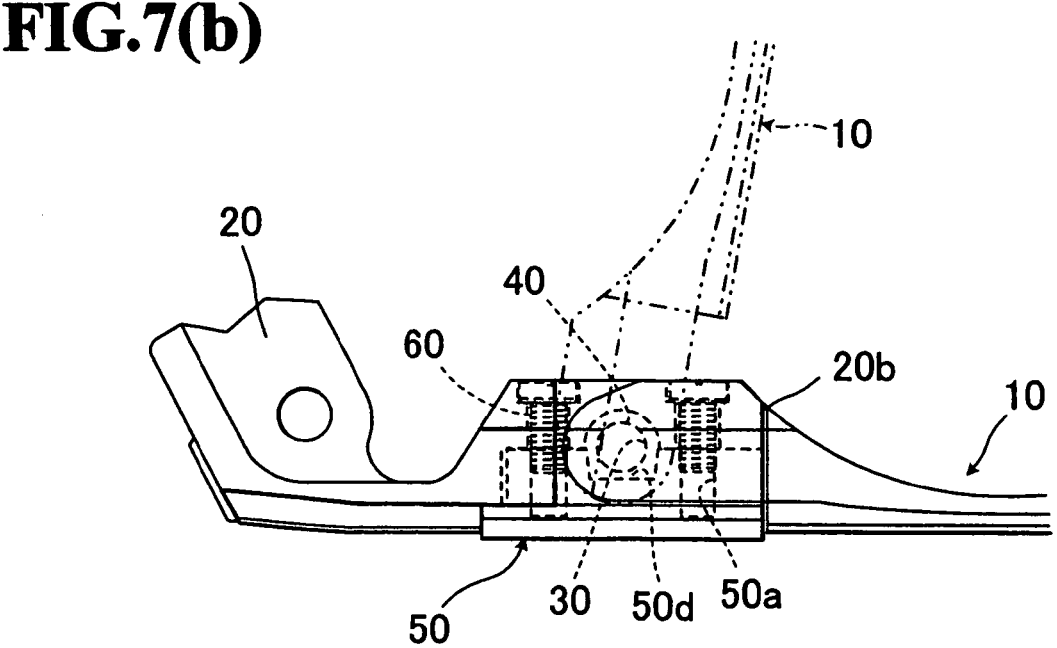

As shown in FIG. 7(a), a trapezoidal groove 50d and screw holes with a bottom 50a are formed in a pressing member 50, and a U-shaped groove portion 20a formed with an arc face and through-holes 20b are formed in a bracket 20 which is a second member. Screw members 60 are screwed to the screw holes with a bottom 50a of the pressing member 50 via the through-holes 20b of the bracket 20, so that the bracket 20, a temple 10 which is a first member, and the pressing member 50 are unitized mutually, as shown in FIG. 7(b). Thereby, frictional resistance is obtained by fastening a cylindrical member 40 between an inner face of a groove 50d of the pressing member 50 and the groove portion 20a of the bracket 20 to fix the same.

Figure 8A:
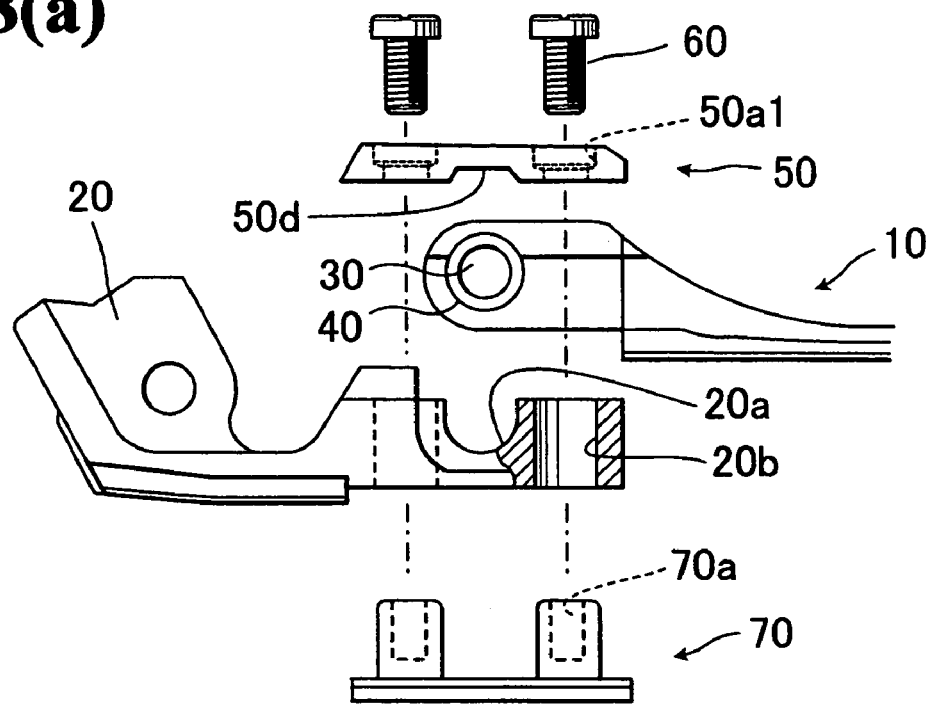
FIGS. 8(a-b) are explanatory views showing still another modification of a revolving structure for a glasses part of the present invention, FIG. 8(a) showing a state before a pressing member and a receiving member are attached to the bracket, and FIG. 8(b) showing a state after the pressing member and the receiving member have been attached to a bracket.
Figure 8B:
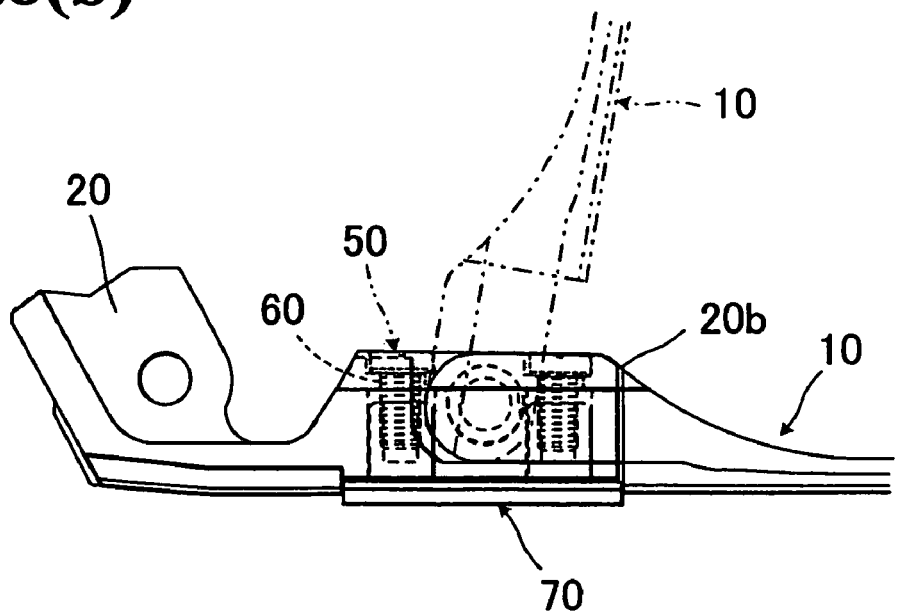
Figure 9A:
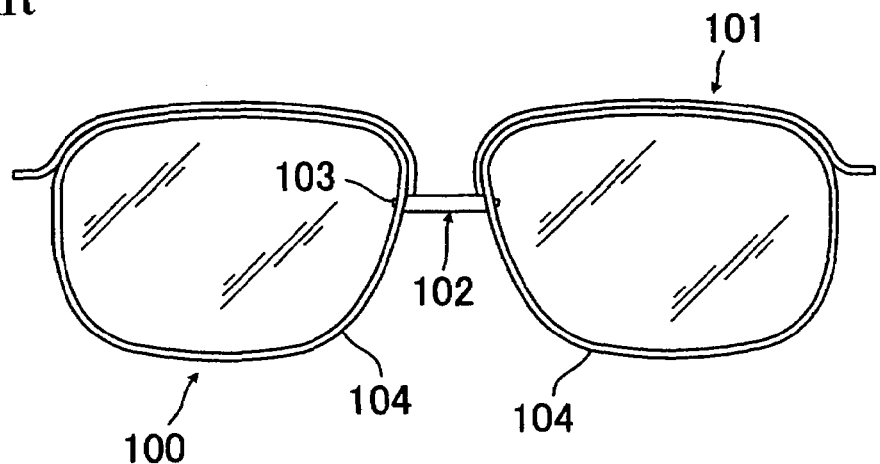
FIGS. 9(a-b) are explanatory views showing one example of a portion to which a conventional revolving structure for a glasses part is applied, FIG. 9(a) showing a state that a main front frame is suspending from a sub-front frame, and FIG. 9(b) showing a state that the main front frame has been revolved relative to the sub-front frame.
Figure 9B:
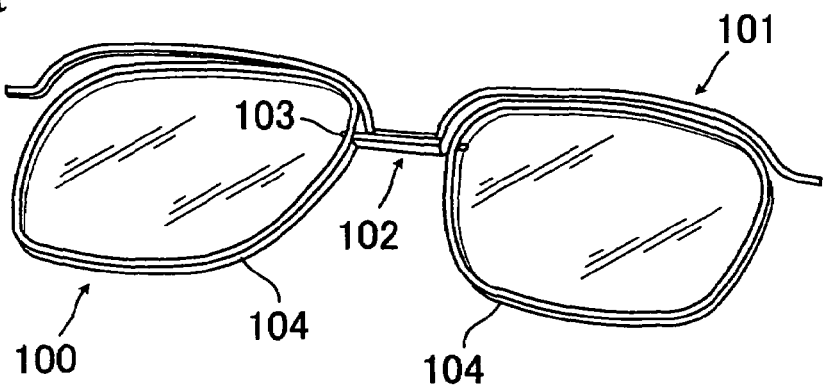
Figure 10:
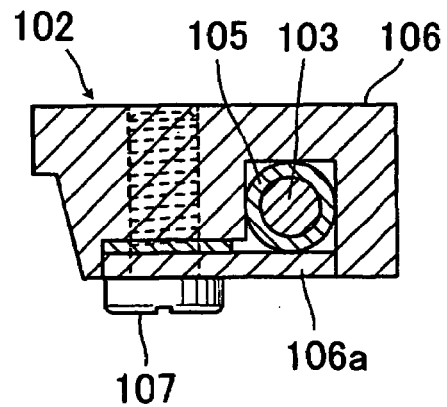
FIG. 10 is an explanatory view showing a revolving structure of the main front frame in the conventional art.

As shown in FIG. 8(a), a trapezoidal groove 50d and through-holes 50a1 are formed in the pressing member 50, and a U-shaped groove portion 20a formed with an arc face and through-holes 20 bare formed in the bracket 20. Further, a receiving member 70 having a screw hole with a bottom 70a is prepared. Screw members 60 are screwed to the screw holes with a bottom 70a of the receiving member 70 via the through-holes 50a1 of the pressing member 50 and the through-holes 20b of the bracket 20 so that the pressing member 50, the bracket 20, the temple 10, and the receiving member 70 are unitized mutually, as shown in FIG. 8(b). Thereby, frictional resistance is obtained by fastening a cylindrical member 40 between an inner face of the groove 50d of the pressing member 50 and the groove portion 20a of the bracket 20 to fix the same.

In the modifications shown in FIGS. 7(a-b) and FIGS. 8(a-b), since it is unnecessary to form a screw hole in the bracket, such a problem does not occur that a bracket which is an important part is discarded as a defective product due to trouble with the formation of a screw hole.

Furthermore, in the embodiments described above, the example where the cylindrical member 4 with a slotted portion is used has been explained, but such a constitution may be adopted that the rotational shaft 3 is press-fitted into a simple cylindrical member which does not include any slotted portion.

In this case, the rotational shaft 3 which has been press-fitted with the cylindrical member is attached between a pair of plate portions 1a of the bracket 1.

What is claimed is:

1. A revolving structure for a glasses part for revolving a second member relative to a first member, comprising:
   a rotational shaft provided on the first member; and
   a cylindrical member with elasticity which is press-fitted on the rotational shaft externally, the cylindrical member being fitted to the second member in a state that the cylindrical member is pressed by a pressing member and prevented from being rotated, even if the rotational shaft of the first member is rotated,
   wherein the second member has a groove portion in which the cylindrical member is fitted and the groove portion is formed with an arc face for contact with a circumferential face of the cylindrical member, and
   wherein the cylindrical member is set to protrude from the groove portion by a constant thickness and a protruding portion of the cylindrical member is pressed by the pressing member, the pressing member being a plate.

2. A revolving structure for a glasses part according to claim 1, wherein the arc face is a half circumferential face.

3. A revolving structure for a glasses part according to claim 1, wherein one end and the other end of the pressing member are fixed to the second member by screw members, and the cylindrical member is pressed by a central portion of the pressing member.

4. A revolving structure for a glasses part according to claim 1, wherein the first member and the second member are a bracket and a temple, respectively.

5. A revolving structure for a glasses part for revolving a second member relative to a first member, comprising:
   a rotational shaft provided on the first member; and
   a cylindrical member with elasticity which is press-fitted on the rotational shaft externally, the cylindrical member being fitted to the second member in a state that the cylindrical member is pressed by a pressing member and prevented from being rotated, even if the rotational shaft of the first member is rotated,
   wherein the second member has a groove portion in which the cylindrical member is fitted and the groove portion is formed with an arc face for contact with a circumferential face of the cylindrical member, and
   wherein a groove portion is formed in the pressing member and the cylindrical member is inserted in the groove portion to come in contact with the pressing member.

6. A revolving structure for a glasses part according to claim 5, wherein the second member, the first member, and the pressing member are fixed to one another by screwing a screw member in a screw hole with a bottom formed in the pressing member via a through-hole formed in the second member.

7. A revolving structure for a glasses part according to claim 6, wherein the first member and the second member are a temple and a bracket, respectively.

8. A revolving structure for a glasses part according to claim 5, wherein the pressing member, the first member, the second member, and a receiving member are fixed mutually by screwing a screw member in a screw hole with a bottom formed in the receiving member via a through-hole formed in the pressing member and a through-hole formed in the second member.

9. A revolving structure for a glasses part according to claim 8, wherein the first member and the second member are a temple and a bracket, respectively.

10. A revolving structure for a glasses part for revolving a second member relative to a first member, comprising:
    a rotational shaft provided on the first member; and
    a cylindrical member with elasticity which is press-fitted on the rotational shaft externally, the cylindrical member being fitted to the second member in a state that the cylindrical member is pressed by a pressing member and prevented from being rotated even if the rotational shaft of the first member is rotated,
    wherein the second member has a groove portion in which the cylindrical member is fitted and the groove portion is formed with an arc face for contact with a circumferential face of the cylindrical member, and
    wherein one end of the pressing member is fitted into the second member, the other end thereof is fixed to the second member by a screw member, and the cylindrical member is pressed by a central portion of the pressing member.

* * * * *